(12) United States Patent
Ritzdorf

(10) Patent No.: US 9,326,489 B2
(45) Date of Patent: May 3, 2016

(54) TRAINING DEVICES FOR DOMESTIC ANIMALS

(71) Applicant: Thomas Lee Ritzdorf, Bigfork, MT (US)

(72) Inventor: Thomas Lee Ritzdorf, Bigfork, MT (US)

( * ) Notice: Subject to any disclaimer, the term of this patent is extended or adjusted under 35 U.S.C. 154(b) by 0 days.

(21) Appl. No.: 14/214,675

(22) Filed: Mar. 15, 2014

(65) Prior Publication Data

US 2014/0366814 A1    Dec. 18, 2014

Related U.S. Application Data

(60) Provisional application No. 61/802,425, filed on Mar. 16, 2013.

(51) Int. Cl.
*A01K 27/00* (2006.01)

(52) U.S. Cl.
CPC ..................................... *A01K 27/001* (2013.01)

(58) Field of Classification Search
CPC .................. A01K 27/00–27/002; A01K 15/02
USPC ................................................ 119/856
See application file for complete search history.

(56) References Cited

U.S. PATENT DOCUMENTS

| | | | |
|---|---|---|---|
| 441,706 A * | 12/1890 | Schneider | 119/864 |
| 2,394,144 A * | 2/1946 | Brose | A01K 27/001 119/862 |
| 5,647,303 A * | 7/1997 | Deioma | 119/864 |
| 6,101,980 A * | 8/2000 | Davies-Ross | 119/856 |
| 6,606,967 B1 * | 8/2003 | Wolfe et al. | 119/856 |
| 6,938,580 B2 * | 9/2005 | Herbst | 119/864 |
| 8,919,295 B2 * | 12/2014 | Voellmecke et al. | 119/856 |
| 2009/0235874 A1 * | 9/2009 | Sullivan | 119/864 |
| 2012/0192811 A1 * | 8/2012 | Robinson | 119/862 |

\* cited by examiner

*Primary Examiner* — Kristen Matter

(57) ABSTRACT

Training devices for domestic animals that do not operate by constricting around the animal's neck are disclosed. These devices have collars or harnesses that maintain their size, with a means for actuating a member or members that protrude inwardly toward the neck of the animal. Actuation of the device by tension from a leash attachment provides a pinching action between the protruding members such that the skin of the neck is pinched to provide a training cue to the animal without choking the animal.

9 Claims, 6 Drawing Sheets

TRAINING DEVICES FOR DOMESTIC ANIMALS

CROSS-REFERENCE TO RELATED APPLICATIONS

This application claims the benefit of U.S. Provisional Application No. 61/802,425, filed Mar. 16, 2013.

TECHNICAL FIELD

The present invention is directed toward training devices such as collars and harnesses for domestic animals, such as dogs.

BACKGROUND

Training collars for dogs are typically choke chain collars or pinch collars, both of which constrict around a dog's neck when tension is applied from the leash. These devices are commonly made of chain, but may include a fabric, webbing, or leather portion. Another type of training device utilizes a loop of rope, fabric, webbing or leather that is made smaller as tension is applied from the leash end of the device. This style of device may be as simple as a rope with a loop at the end. The other end is inserted through the loop to make a larger loop that slips freely, which is placed around the neck of the animal. A major problem with all of these training devices is that they work by applying a constricting, or choking, action on the animal's neck.

One design which eliminates the unrestricted choking action of the training device is made by using a separate loop to cause the collar to constrict, with a strap or chain of a fixed length attached by loops to the constricting loop. This style of device still operates based on a constricting or choking action, but the extent of constriction around the neck is limited due to the fixed-length portion of the device. However, when a separate chain loop is used to cause the collar to tighten it is possible for a dog to get a paw caught in that loop which is difficult to remove and may pose an injury risk to the animal.

Another limitation of these prior art devices is that they are not appropriate to be worn by the animal full time due to the risk of choking injury or death. This means that these devices must be put on the animal just before they are used, and removed immediately after use. Besides the inconvenience of applying and removing the training device, this may give the animal being trained the cue that it must obey training commands while the device is being worn, but not once it is removed.

SUMMARY

The present invention is directed toward training devices, such as collars and harnesses for domestic animals. The present invention is for training collars or harnesses which provide a pinching action without constricting or choking the animal. Key attributes of these devices are:

1) The device maintains its size, or diameter, once put on, so does not work based on a choking action.

2) The pinch points are soft rubber-like material rather than pointed metal prongs.

3) The trainer pulling on the leash causes the pinch members to pinch or grab the skin of the neck.

DETAILED DESCRIPTION

Figure 1:
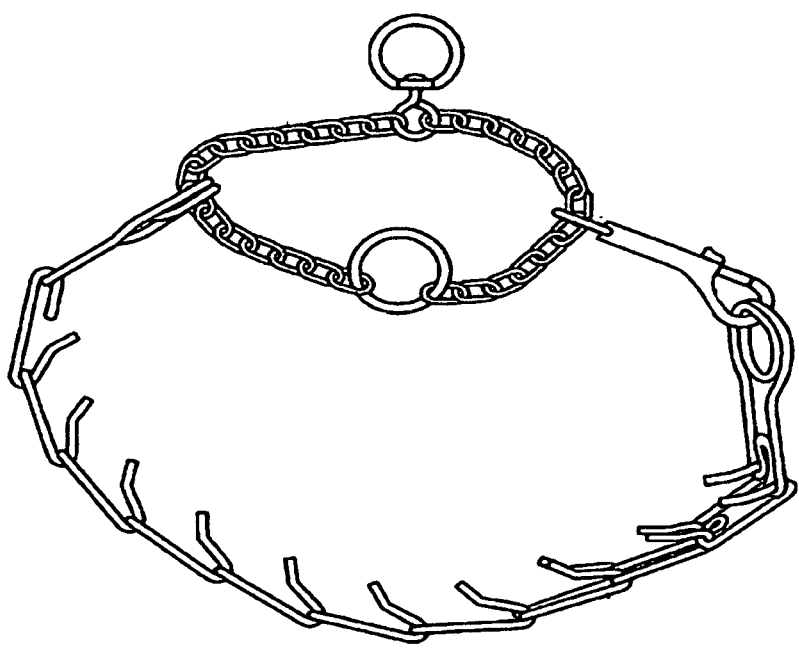
FIG. 1 is an illustration of a prior art training device.
Figure 2:
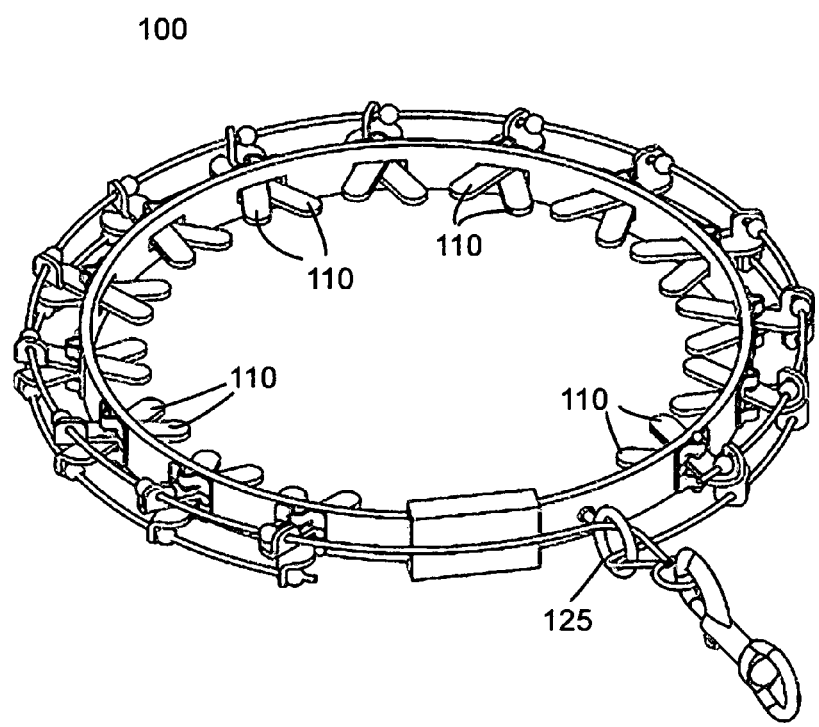
FIG. 2 is a schematic illustration of an embodiment of the invention having opposing protruding members designed to pivot in opposite directions.
Figure 3:
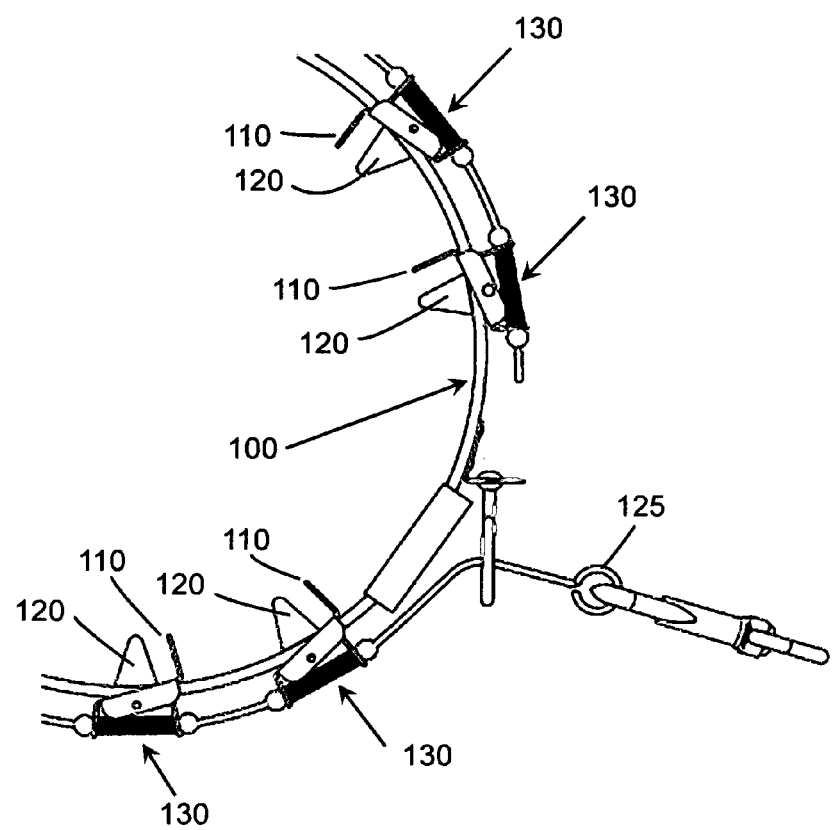
FIG. 3 is a schematic illustration an embodiment of the invention with actuated protruding members designed to actuate against static protruding members and spring functions to return each actuated member to its non-actuated position when the actuating force is released.
Figure 4:
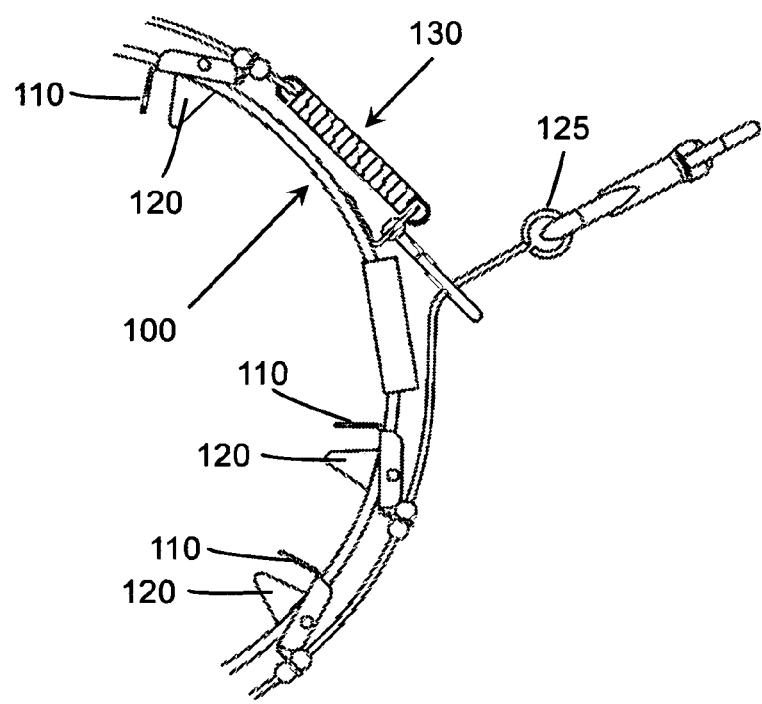
FIG. 4 is a schematic illustration of an embodiment of the invention with multiple actuated protruding members that actuate to pinch against static protruding members, all returned to the non-actuated position by a single spring mechanism.
Figure 5:
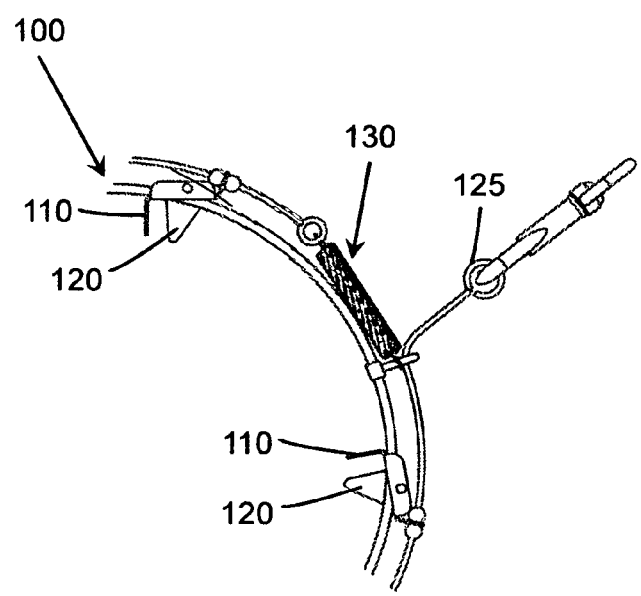
FIG. 5 is a magnified illustration of the actuation and spring mechanisms of FIG. 4.
Figure 6:
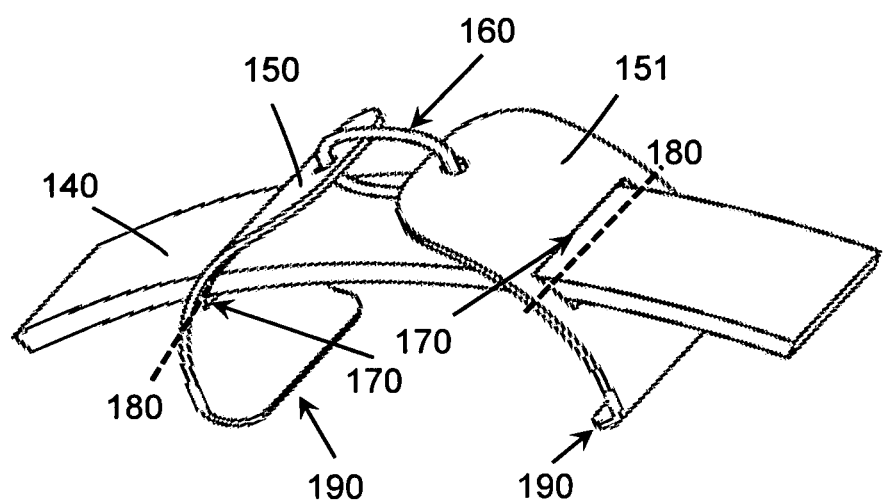
FIG. 6 is an illustration of an embodiment of the invention with two metal "jaws" connected by a metal ring, attached to a collar by slipping the collar through a slot in each "jaw" piece, allowing the "jaws" to pivot about the slot axis.

There is a need for training devices for domestic animals that do not work by choking the animal. The present invention is directed toward such training devices, such as collars and harnesses for domestic animals. The present invention is for training collars or harnesses which provide a pinching action without constricting or choking the animal. Key attributes of these devices are:

1) The device maintains its size, or diameter, once put on, so does not work based on a choking action.

2) The pinch points are soft rubber-like material rather than pointed metal prongs.

3) The trainer pulling on the leash causes the pinch members to pinch or grab the skin of the neck.

4) The collar can be made of chain, fabric, webbing, or leather.

In one embodiment of this invention, a collar 100 or harness is provided, with one or more prongs or extensions 110 configured so as to pivot about the collar 100 or harness when activated. This pivoting action causes the prongs or extensions 110 to pinch together with another protrusion 120 on the collar. These other protrusions 120 may be fixed to the device so as not to move, or they may also be pivoting members 110 attached so as to pivot in the opposite direction upon activation. Activation of the pivoting members 110 is preferably provided by tension provided from a leash or similar attachment 125.

In a further embodiment of the invention, the extensions 110 from the collar 100 or harness that enable the pinching action are coated with a rubber-like or silicone-like type of material. This material is characterized by being flexible and soft, compared to the metal which supports it, and it tends to grip the animal's hair or fur when in contact with it. This gripping action helps to pinch the skin of the animal's neck and provide a training cue, without allowing the skin to simply slip past the pinching member.

In yet a further embodiment of the invention, the pivoting member 110 is operably coupled to one or more springs or elastic attachments 130 that cause it to move back to the unactuated position when tension is removed from the actuation attachment. Such a device is designed to function when tension is applied in order to give the animal a cue for training, such as in obedience training, but to automatically release when such tension is removed from the actuation attachment point 125.

In a further embodiment of the invention, a device is provided that can be attached to a standard collar or harness 140. The attachment device works by providing two pieces of metal 150, 151 that connect to a leash attachment, preferably through the use of a metal ring 160 or similar device, which pivot about the collar or harness 140 that they are attached to in order to provide a pinching action on the skin of the animal's neck. The leash is connected to the metal ring 160 so when the leash is pulled the two pieces come together to pinch the animal's skin as they pivot around the collar 140. The metal pieces are designed with a slot 170 in them, such that the body of the collar or harness 140 passes through the slot 170. The design provides for rotation about the axis 180 of the slot 170, through which the collar or harness 140 attaches. Ideally the jaws 190 of the device, at least, are coated with a soft material like rubber or silicone. This makes the device softer on the animal's skin and also provides a gripping characteristic to the device, which helps hold on to the skin without having it simply slip through. This embodiment of the invention allows the device to be added to a standard collar 140 and to be fabricated separately from the collar itself.

A significant advantage of these types of training devices is that they can be worn all the time, not just during training, due to the fact that they do not constrict around the animal's neck and cause a choking hazard. This allows training to take place using a device that is worn at all times, and thus removes a cue to the animal that may teach it that it must obey only when the training device is worn.

From the foregoing, it will be appreciated that specific embodiments of the invention have been described herein for purposes of illustration, but that various modifications may be made without deviating from the spirit and scope of the invention. For instance, the figures and descriptions focus on a collar-based device. However one of ordinary skill in the art will recognize that these designs could easily be used with a harness rather than a collar. Accordingly, the invention is not limited except as by the appended claims.

I claim:

1. A device for training an animal, the device comprising:
a strap for encircling the animal's neck;
two or more members protruding inwardly from said strap, at least one of said two or more members moves from an unactuated position when an actuating force is applied such that skin of the animal's neck is pinched between two of said two or more members when the device is in use;
wherein the actuating force is created by tension from a leash attachment and wherein application of the actuating force does not cause the device to constrict around the animal's neck when the device is in use.

2. The device of claim 1, where the strap is a collar or part of a harness.

3. The device of claim 2, further comprising: a soft, flexible coating on said two or more members.

4. The device of claim 2, further comprising: a spring or elastic attachment that causes the at least one member of said two or more members to move back to the unactuated position when the actuating force is removed.

5. A device for training an animal, comprising:
a strap for encircling the animal's neck;
at least two members attached to said strap so as to pivot about an axis transverse to said strap upon application of an actuating force;
a portion of said members protruding inwardly from said strap, such that, in use, skin of the animal's neck is pinched between said at least two members upon the application of said actuating force;
wherein the actuating force is created by tension from a leash attachment and wherein application of the actuating force does not cause the device to constrict around the animal's neck when the device is in use.

6. The device of claim 5, where the strap is a collar or part of a harness.

7. The device of claim 6, further comprising: a soft, flexible coating on at least a portion of said at least two members.

8. A device for training an animal, the device comprising:
a strap for encircling the animal's neck or body;
two or more members protruding inwardly from said strap, at least one of said two or more members moves from an unactuated position when an actuating force is applied such that hair, fur or skin of the animal's neck or body is gripped between two of said two or more members when the device is in use;
wherein the actuating force is created by tension from a leash attachment and wherein application of the actuating force does not cause the device to constrict around the animal's neck or body when the device is in use.

9. The device of claim 8, further comprising:
a soft, flexible coating on said two or more members.

\* \* \* \* \*